March 21, 1939.  L. V. PITTMAN ET AL  2,151,439
FURNACE AND CONTROL THEREFOR
Filed Aug. 26, 1936  7 Sheets-Sheet 3
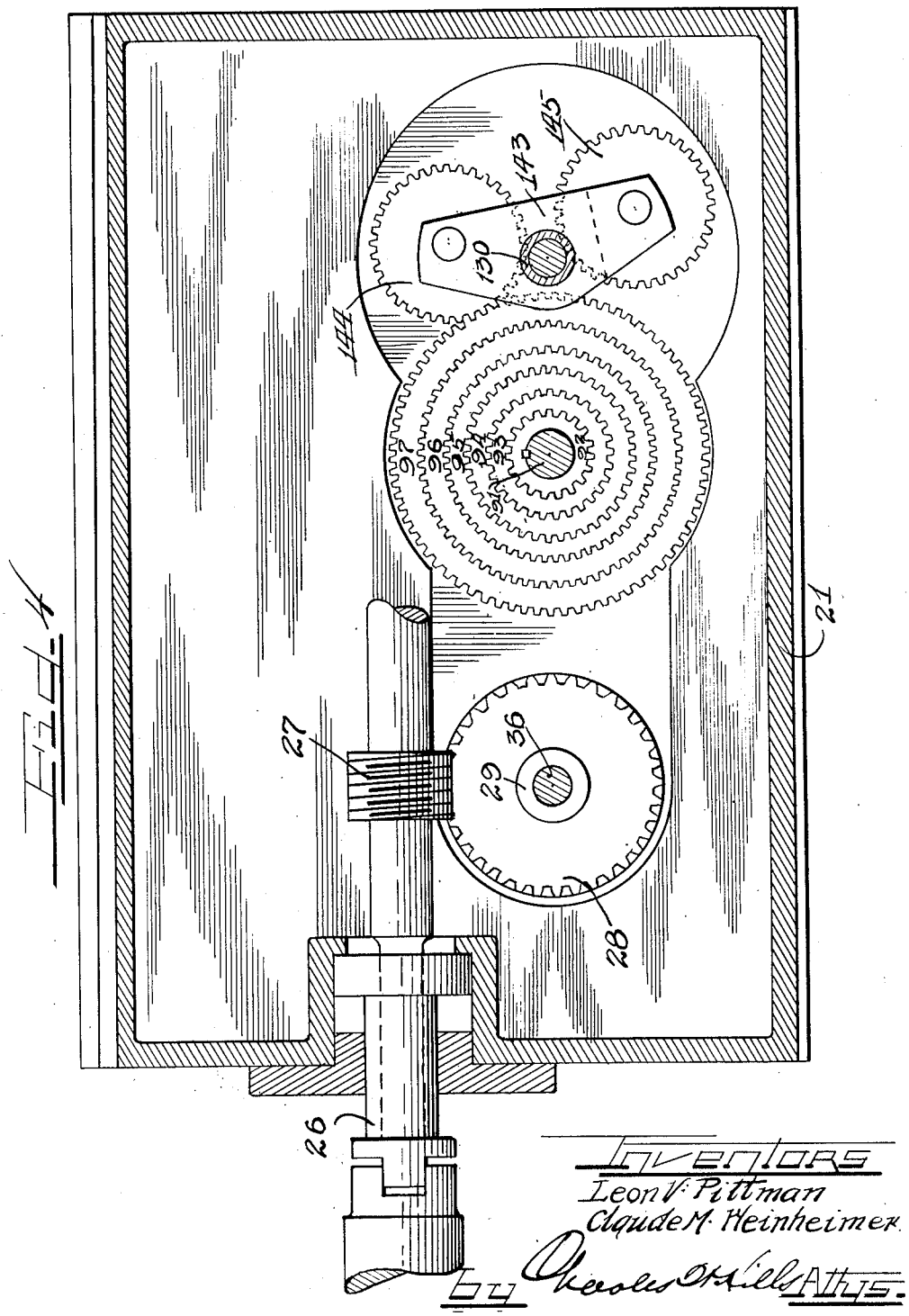

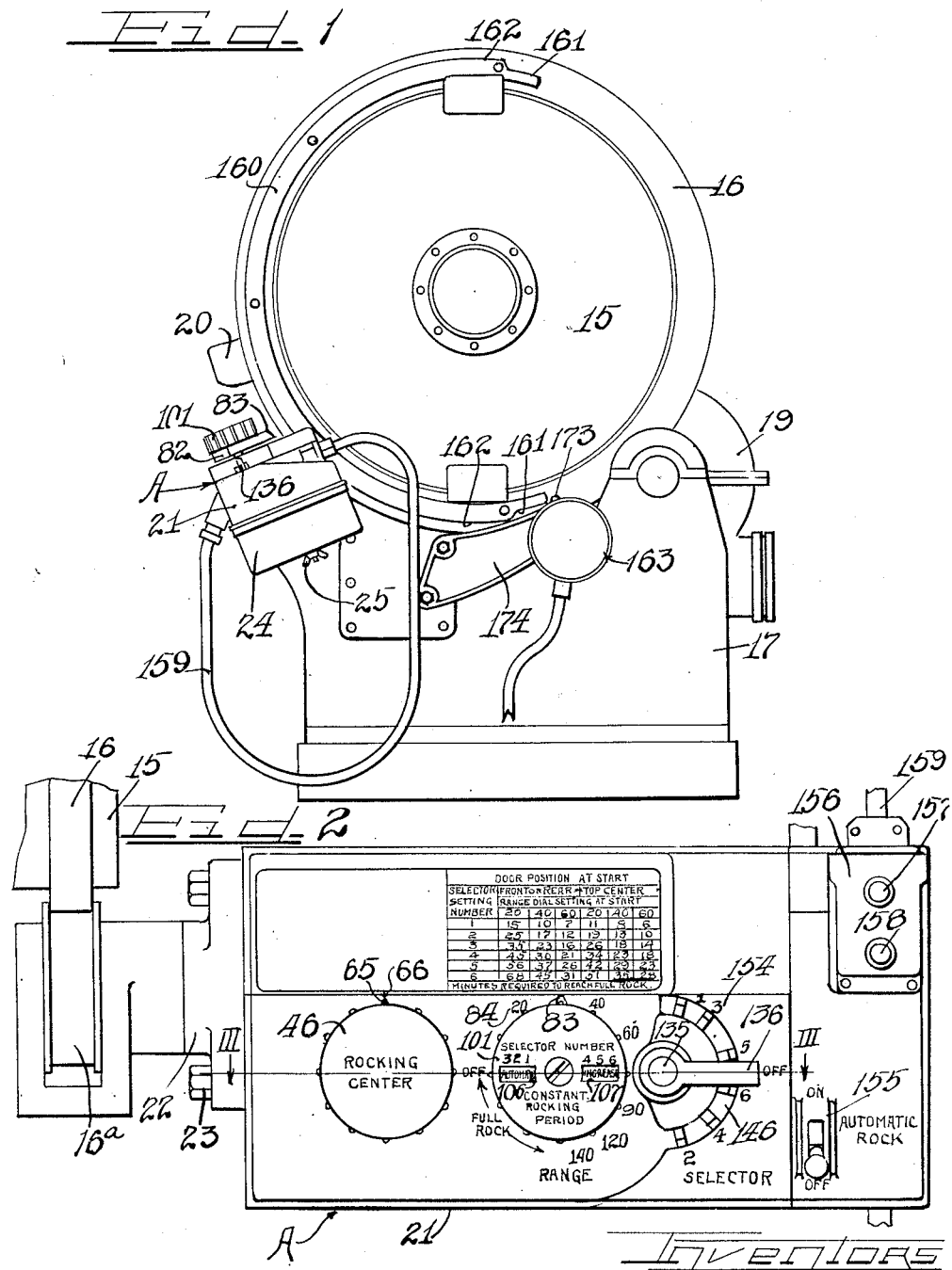

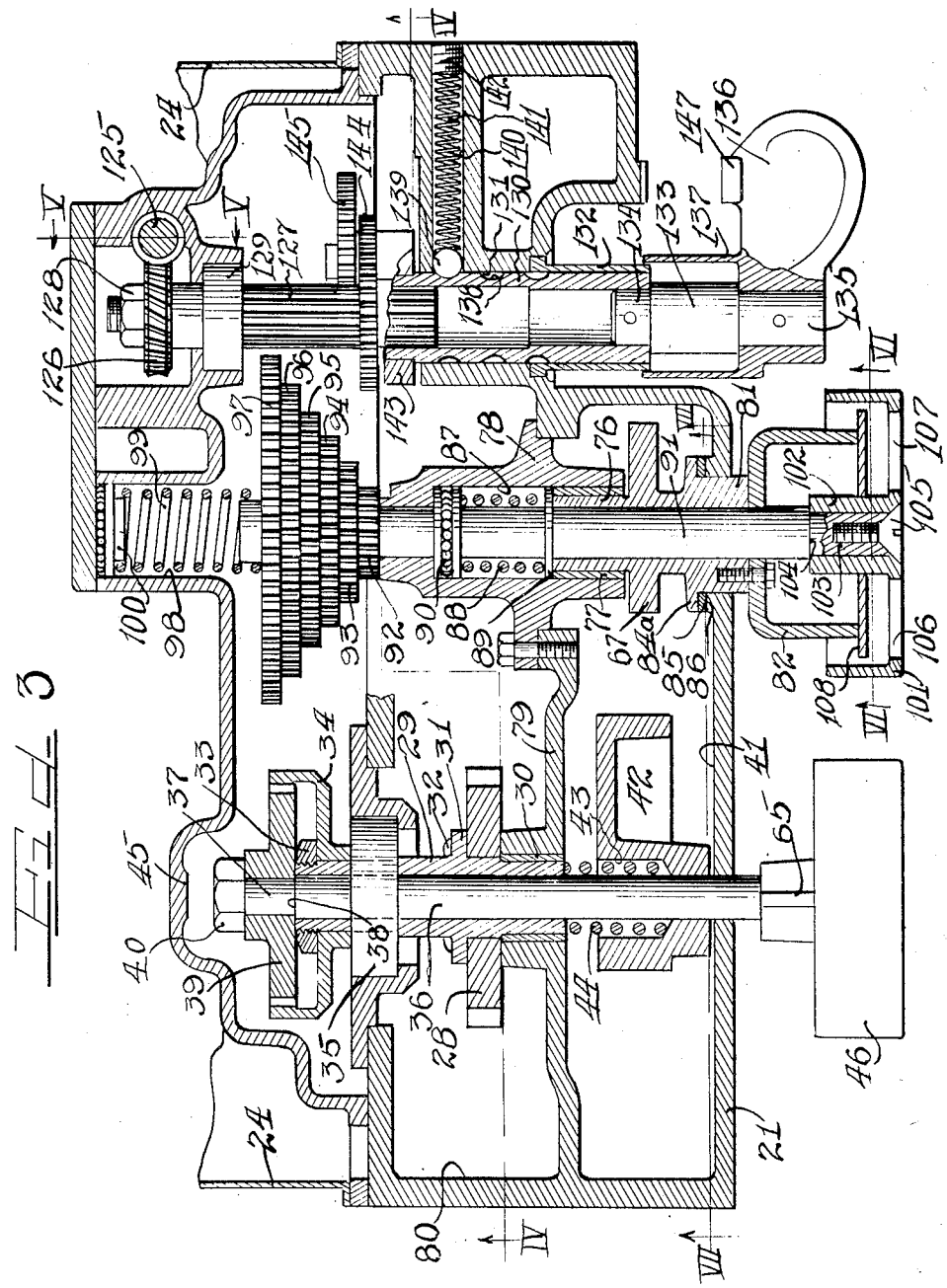

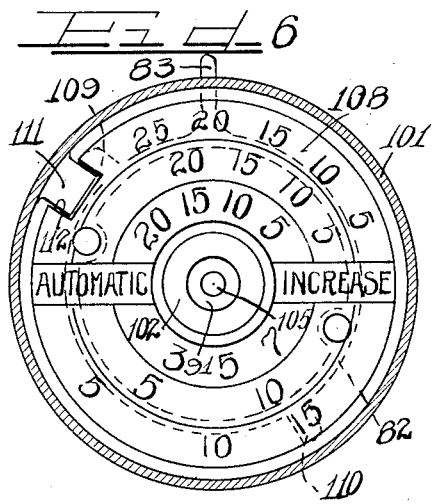
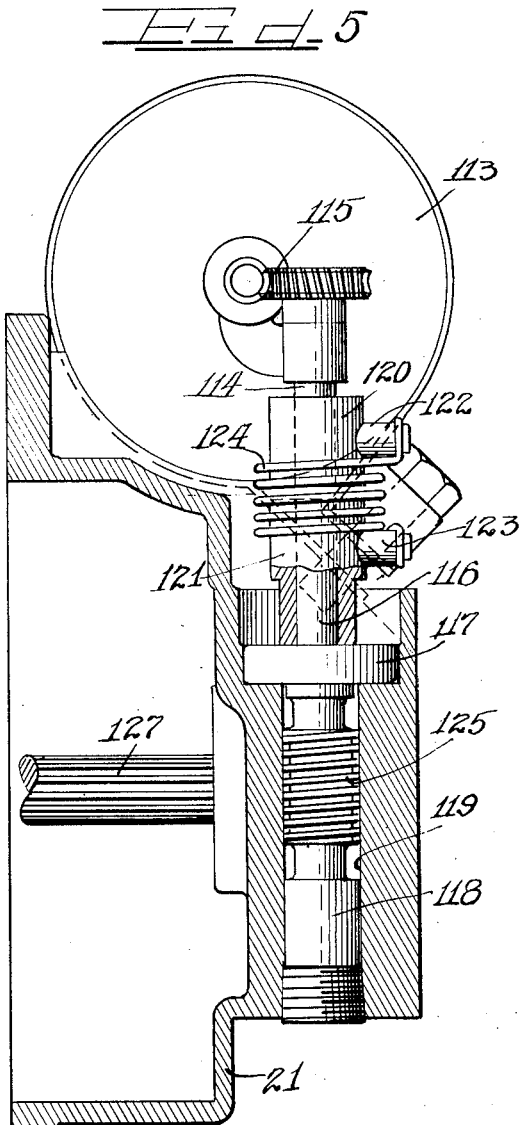
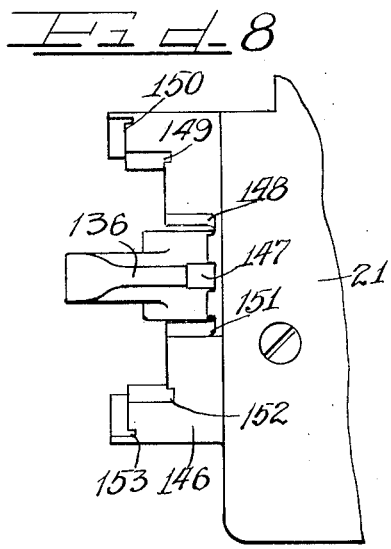

March 21, 1939.  L. V. PITTMAN ET AL  2,151,439
FURNACE AND CONTROL THEREFOR
Filed Aug. 26, 1936  7 Sheets-Sheet 5
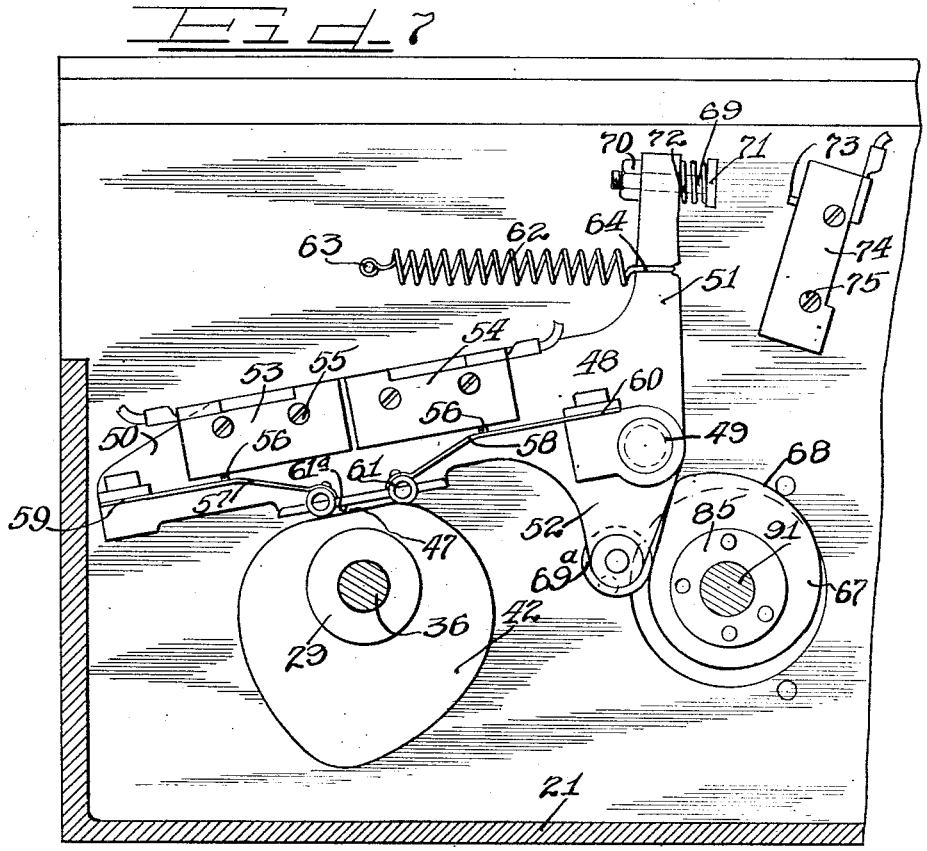
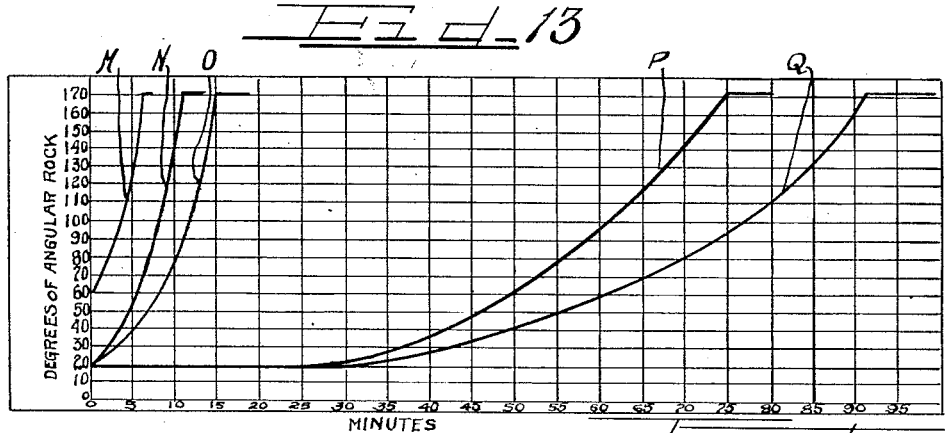
Inventors
Leon V. Pittman.
Claude M. Heinheimer.

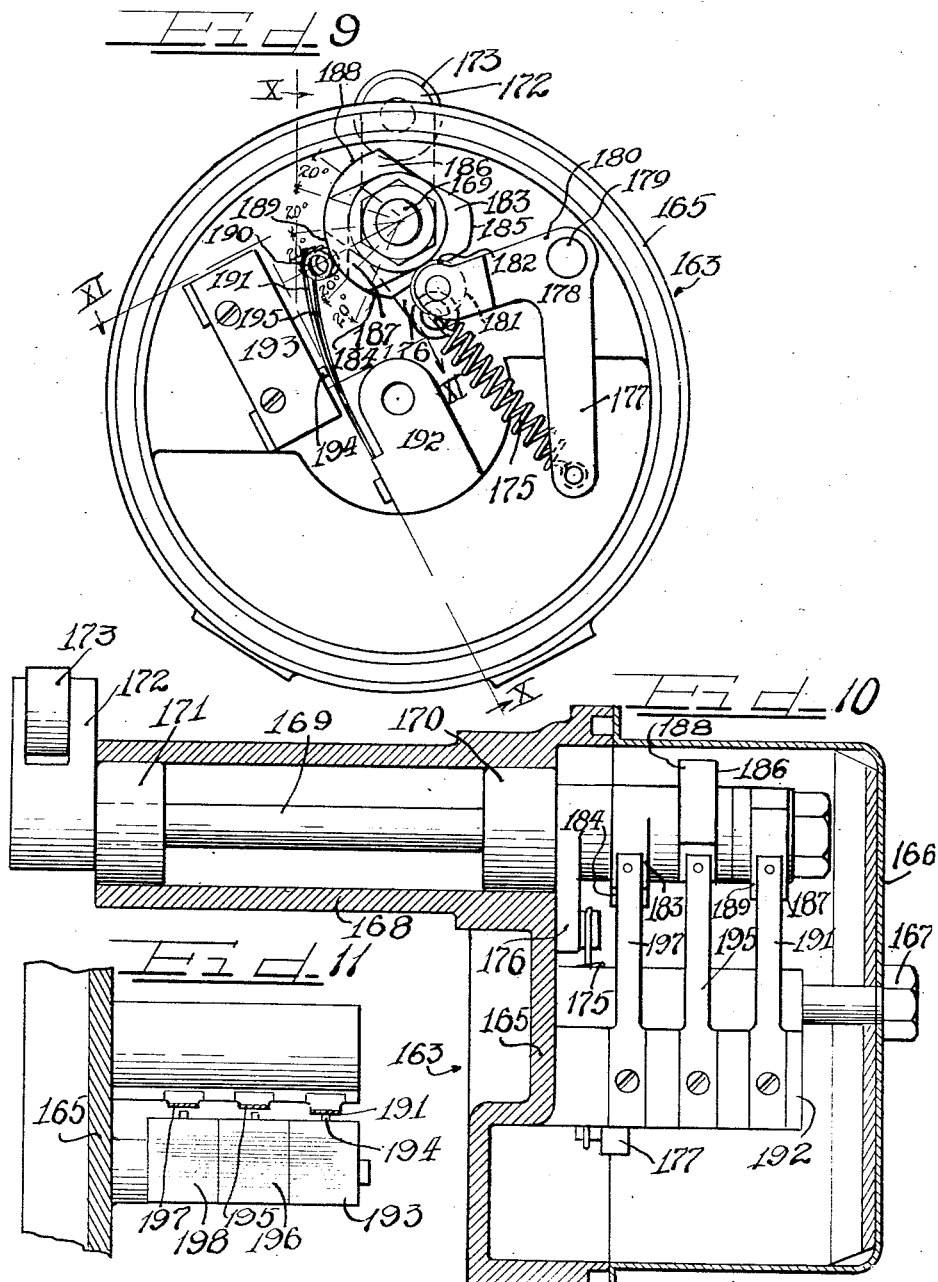

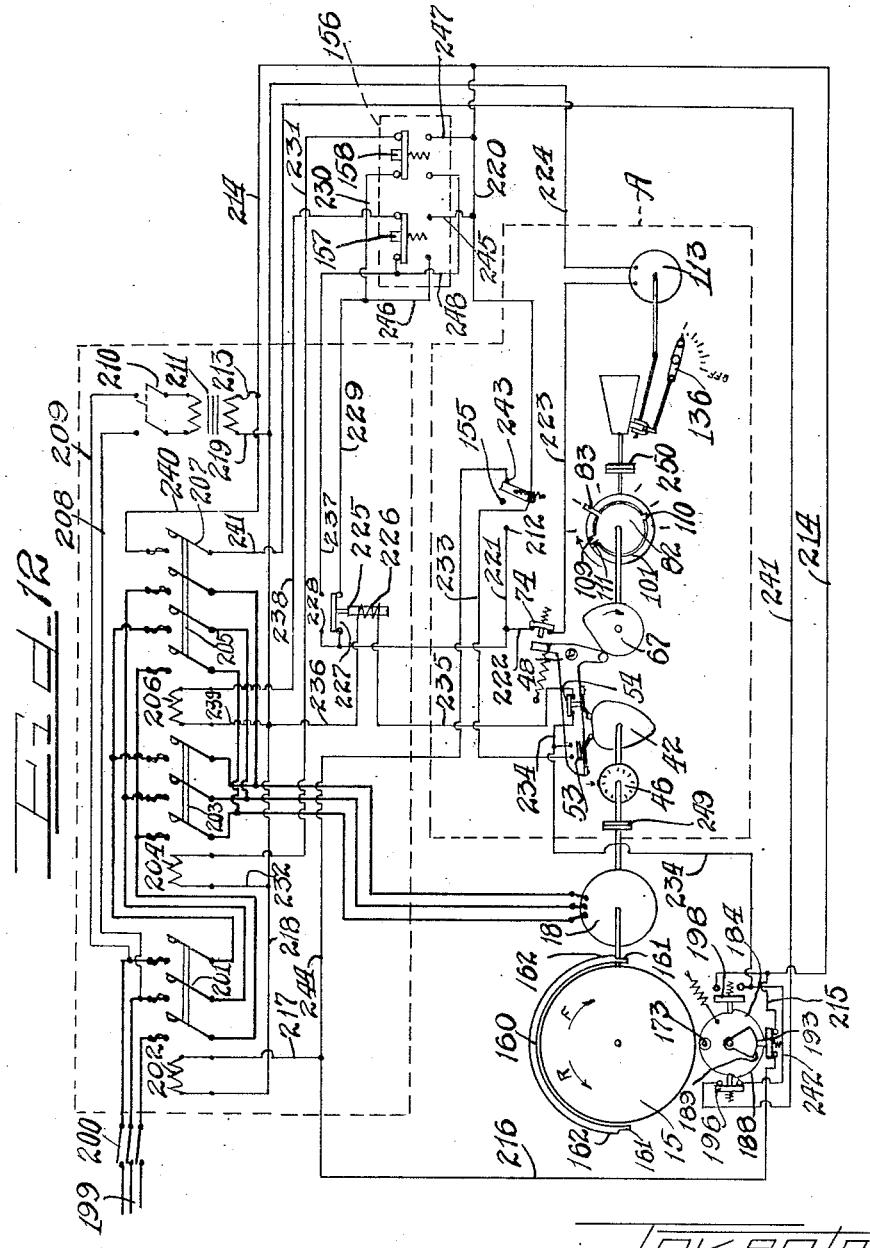

Patented Mar. 21, 1939

2,151,439

UNITED STATES PATENT OFFICE 2,151,439

FURNACE AND CONTROL THEREFOR

Leon V. Pittman, Dearborn, and Claude M. Weinheimer, Detroit, Mich., assignors, by mesne assignments, to Kuhlman Electric Company, Bay City, Mich., a corporation of Michigan Application August 26, 1936, Serial No. 97,932

28 Claims. (Cl. 263—33)

The present invention relates generally to a furnace for melting of metals, and more particularly to improvements in control means for such devices of the type wherein the melting chamber is rotated or rocked during the melting operation.

Attempts have been made in the past to produce suitable mechanisms for controlling the rocking cycles of such furnaces, so as to obtain the best results under varied conditions of operation. These mechanisms have embodied mechanical, electrical and combination mechanical-electrical arrangements, but as far as we have knowledge, these attempts have failed to produce a control mechanism of sufficient flexibility to permit wide variations in the rocking cycle in a quick and easy manner.

In the operation of furnaces of the hereindescribed type, it has been found that the best results are obtained when the "angle of rock" or "rocking range" is the greatest possible without damage to the electrodes. In order to maintain such condition it will be apparent that this angle of rock will not be the same during different parts of the melting cycle. During the earlier part of the melting cycle, the roof of the melting chamber is at higher temperature than the hearth, which is protected by the charge. As the surfaces of the charge become softened, they tend to adhere and thus prohibit tumbling which might damage the electrodes. The rocking angle might therefore be increased as the melting progresses.

A gradually increasing volume of metal becomes molten and washes back and forth over the lining surface of the melting chamber and that portion of the charge which has not been melted. As the rocking proceeds, the molten metal absorbs additional heat from the higher temperature lining and carries it to the unmelted charge, thus introducing heat into the metal which would otherwise be wasted.

It will be apparent therefore that at the beginning of the melting cycle, depending upon the melting characteristics of the metals composing the charge, it might be desirable to maintain the rocking angle at a small constant value for a predetermined interval of time before starting to increase the rocking angle, or it might be desirable to begin the operation with a very small rock having a very small rate of increase. In either case, after a given interval the angle of rock and its rate of change may be increased.

Consequently, it therefore follows that for securing the best results, the angle of rock should be increased at substantially the same rate as the rate at which the charge of metal is being melted.

The complete rocking cycles for charges of different metals may therefore vary greatly in their characteristics such as, for example, the length of rocking time, the amount of the angle of rock at different periods of the cycle, the rate of increase of the angle of rock at different portions of the cycle, etc.

It is therefore a primary object of the present invention to provide control mechanisms which will enable selective adjustment of the constant and variable characteristics of the various elements of the rocking cycle to give a desired cycle of operation, and which will permit a presetting of the control mechanism so that once the rocking is started, the pre-determined cycle will be automatically carried out without further attention from the operator. Incident to this object of our invention are numerous other objects, the attainment of which contributes materially to the achievement of the primary object. These objects appear more fully in the accompanying specification, and include the following:

(1) To provide improved means for normally preventing rocking of the melting chamber in a forward or reverse direction beyond safe limits.

(2) To provide improved protective means for stopping the rocking operation in the case of an abnormal condition of operation, which would cause the melting chamber to travel in a forward or reverse direction past the safe maximum angle of rock limits.

(3) To provide improved means for controlling the rate of increase of the rocking angle.

(4) To provide push button control for manually augmenting the automatic operation of the furnace.

(5) To provide jogging push button control for moving the melting chamber during the pouring operation.

(6) To provide improved index for indicating the center of the rocking angle.

(7) To provide improved mechanism for automatically controlling the amount of increase of the rocking angle.

(8) To provide a limit switch mechanism having an actuating member which is adapted upon predetermined initial movement in opposite directions from a normal position to respectively operate a set of control contacts, and which will upon further movement in either direction operate a third common set of contacts.

(9) To provide automatic means whereby the melting chamber may be initially rocked through a selected constant rocking angle for a predetermined period of time, after which the angle of rock will be progressively increased for a subsequent predetermined period of time at a varying rate.

In accordance with the general features of the invention, it is proposed to provide a pair of control cams, one of which is oscillated in accordance with the oscillatory movements of the furnace, and the other of which is driven by a timing motor through a variable speed connection. The first of these cams is substantially heart shaped and is arranged to alternately actuate in its oscillatory movement a pair of switches for normally controlling the direction of movement of the furnace.

These control switches are mounted on a pivotally supported arm, whereby movement of the arm will vary the distance of the switches relative to the associated cam surface with the result that it will be necessary for the cam to oscillate a greater distance before the switches are actuated. In other words, movement of the pivoted arm will cause a variation in the angle through which the melting chamber is rocked. Moreover, the rate of increase in the rocking angle will be in accordance with the speed of movement of the pivoted arm.

The second cam is therefore utilized to control the movement of the pivoted arm, and a cam surface is selected for this cam of such pitch as to give the desired increases in the amounts of the rocking angles.

By driving the second cam at different rates of speed, the length of time in which the rocking cycle will be completed may be varied, that is, the time interval required to progress from a predetermined minimum value of rock to a predetermined maximum value of rock It will also be evident that by disconnecting the timing motor so that the second cam is not actuated, and by setting the second cam at any position in its course of movement, a constant rocking at the angle determined thereby will result.

Also, by providing a lost motion connection between the timing motor and the second cam, which connection is adjustable so as to necessitate running of the timing motor for different periods of time before the cam begins to operate, it is possible to rock the chamber at a selected constant angle of rock for the selected period of time before the cam begins to move and increase the angle of rock for the balance of the rocking cycle.

An additional feature of the invention resides in the provision of cam actuated control switches which are arranged to be operated by cams supported on the chamber. These control switches are so connected with the normal control mechanism that whenever the normal control operates to cause the chamber rock to reach the maximum safe rocking angle limits, the cam actuated switches associated directly with the chamber will be operated to supersede the normal control and continue the rocking movement at the maximum angle of rock.

The cam and switches which are actuated in response to the direct movement of the chamber are further arranged so that if the chamber during abnormal operation should tend to move past the safe angle of rock limit, then the switches are actuated to stop the chamber operating mechanism.

A still further feature resides in the provision of push button control equipment which may be used to supplement the automatic control mechanism, for operating the chamber so that it may be moved in any desired direction, as for locating the charging door of the chamber during the charging operation or for jogging the chamber during the pouring operation.

Other objects and features of the invention will more fully appear from the following detailed description taken in connection with the accompanying drawings which illustrate a single embodiment thereof, and in which:

Figure 1 is an end view of a furnace and control therefor embodying the features of the herein described invention;

Figure 2 is an enlarged fragmentary plan view of the main control mechanism, showing its connection to the furnace;

Figure 3 is an enlarged sectional view through the main control mechanism to show the cooperative relationship of its internal parts, taken substantially on line III—III of Figure 2;

Figure 4 is an enlarged sectional view through the main control mechanism to show the details of the driving connection from the furnace and variable speed driving connection with the timing motor, taken substantially on line IV—IV of Figure 3;

Figure 5 is a partial sectional view, with parts shown in elevation, to show the driving connection between the timing motor and the main control mechanism, taken substantially on line V—V of Figure 3;

Figure 6 is a sectional view through the adjusting knob for the "rocking angle" showing the index dial associated therewith, taken substantially on line VI—VI of Figure 3;

Figure 7 is an enlarged fragmentary sectional view through the main control mechanism showing the details of the cam arrangement for controlling the rocking angle and increase of the rocking angle, taken substantially on line VII—VII of Figure 3;

Figure 8 is a view in elevation of the selector for varying the speed of the timing motor drive;

Figure 9 is a view in elevation of the maximum rock and over travel limit switch, the cover being removed to show the details of its interior mechanism;

Figure 10 is a sectional view of the same, taken substantially on line X—X of Figure 9;

Figure 11 is a partial sectional view showing further details of the limit switch, taken on line XI—XI of Figure 9;

Figure 12 is a view diagrammatically showing the electrical and mechanical elements of the invention together with the inter-connecting electrical control circuits; and Figure 13 is a graphical representation of typical rocking cycles which may be attained with the present invention.

*General description*

Illustrative of the present invention, there is shown in Figure 1 a furnace of the rocking type to which the herein described novel control has been applied. Although the control equipment has been described herein in connection with an electric furnace, it will be evident to one skilled in the art that the control equipment may be with equal facility applied to any other device of a similar nature.

The rocking furnace embodies a melting chamber 15 of cylindrical form, this chamber being provided with longitudinally spaced rails 16 extending circumferentially around the shell which defines the chamber. These rails are adapted to be supported on spaced rollers 16a rotatably mounted in suitable bearings in a supporting base structure 17.

The melting chamber is rocked back and forth by means of a main driving motor 18 which is connected through suitable speed reduction gears contained in the gear housing as shown at 19. It is preferred to use a driving motor which may be electrically reversed, and, in the present instance, the motor is disclosed as being of the polyphase type which may be reversed simply by changing the phase connections of the motor.

Any suitable form of driving connection such as a pinion and gear connection may be used for connecting the motor to the shell defining the melting chamber.

The shell is provided with a pouring spout 20 which determines the safe maximum rocking angle of the chamber. In other words, it is not desirable to rock the chamber through an angle which would cause the molten metal to wash past the entrance of the pouring spout. Although not shown, the furnace is provided with suitable electrodes which are mounted in each end of the furnace chamber and are in axial alignment at the center of rotation of the chamber.

All parts of the control equipment which are arranged to be adjusted and manually operated by the operator of the furnace are contained in a main control unit which is generally indicated at A.

The main control unit is located at one end of the furnace and in such a position that the operator may have an unobstructed view so that the furnace may be properly controlled during the pouring and charging operations, and in adjusting the control equipment to secure different rocking cycles.

The main control unit is provided with control knobs which may be manipulated by the operator and adjusted to give any type of rocking cycle desired. Not only does the operator have complete control of the angles through which the chamber may be rocked, but adjustments are provided so that it is possible to increase the angle of rock at a predetermined rate. Moreover, selector means are provided so that the time interval of the rocking cycle may be increased and decreased as desired. The electrical control for turning the automatic rocking mechanism "on" and "off" is conveniently mounted for manipulation by the operator, and manual push button control is also placed so as to be within easy reach of the operator.

*Main rocking control mechanism*

The main rocking control mechanism is contained in a box-like housing 21 which is supported at one end by means of a flanged fitting 22 connected at one end to the housing as by bolts 23 and at its other end forms a part of the bearing support for one of the wheels or rollers as shown at 16a upon which the chamber is rotatably supported.

The bottom portion of the housing is formed by a pan or cover 24 which is removably held in position by a thumb nut 25. The upper surface of the housing has disposed thereon the various control elements for adjusting the different characteristics of the rocking cycle.

The rocking movement of the melting chamber is transmitted from the wheel or roller 16a associated with the main control unit, through a shaft connection 26, as shown in Figure 4, this shaft being rotatably supported in the bracket fitting 22.

Mounted on the shaft 26 is a worm 27 which meshes with a worm wheel 28. The worm wheel 28 is secured at one end of a rotatably mounted sleeve 29 having its associated end rotatably supported in a bearing 30. The worm wheel is secured to a peripheral flange 31 on the sleeve as by rivets 32. The other end of the sleeve is threaded to receive a nut 33 by means of which an internal ring gear 34 is secured to this end of the sleeve. Between the worm wheel 28 and the internal ring gear 34, the sleeve is rotatably supported in an anti-friction bearing 35.

A shaft 36 extends through the sleeve 29 and is rotatably supported therein. One end of this shaft is contracted as shown at 37 to form a shoulder 38 for abutment by a gear 39 which is held onto the contracted portion by means of a nut 40. The teeth of the gear 39 mesh with the internally disposed teeth of ring gear 34.

The opposite end of the shaft 36 projects through a cam compartment 41 and through the forward side of the main control unit housing.

Secured to the shaft 36 for rotation therewith is a cam member 42 having a socket 43 on its back side surrounding the shaft for receiving one end of an expansion spring 44. The other end of this spring bears against the adjacent end of the sleeve 29. It will be apparent that with this arrangement, the spring 44 tends to axially move the shaft 36 in such a direction as to retain the gear 39 in mesh with the teeth of gear 34, but that by pushing the shaft 36 in the opposite direction, these two gears may be disengaged. This disengaging movement of shaft 36 is limited by an abutment pad 45 which is formed in the housing adjacent the nut 40.

By depressing a knob 46, the gears 33 and 34 may be moved out by meshing engagement and the position of cam 42 may be adjusted. Releasing the knob 46, the gears 34 and 39 are restored to meshing engagement.

As shown in Figure 7, it will be observed that the cam 42 is substantially heart shaped having a plain cam surface 47 at its shortest radius.

Cooperatively associated with the cam 42 is a T-shaped arm 48 which is mounted for pivotal movement about a pivot pin 49. The respective legs of this member are shown at 50, 51, and 52. The long leg 50 carries a pair of switches 53 and 54, these switches being secured to the arm as by suitable screws 55. These switches may be of circuit closing or opening type and are each provided with an actuating pin or button 56 which will actuate the associated switch when it is depressed.

A pair of oppositely extending resilient fingers 57 and 58 are anchored at their outer ends as shown at 59 and 60 to the leg 50. The free ends of these fingers are provided with cylindrical bearing members 61 which are adapted to bear against the surface of the cam 42 and normally project slightly past a cam abutment surface 61a on the leg 50. The arm 48 is normally actuated in a counter-clockwise direction by the action of a tension spring 62 having one end anchored as at 63 to a portion of the housing, and its other end 64 secured to the leg 51 of the arm.

From the foregoing description it will be apparent that if the switches 53 and 54 are so chosen so as to respectively control the reversing movement of the melting chamber, and since the cam 42 will be rocked in accordance with the movement of the chamber, the cam will alternately actuate the switches 53 and 54 and control the alternate rocking movement of the chamber. Moreover, if the arm 48 is moved in a clockwise direction so that the switch assembly just described is moved away from the cam surface, greater amounts of rocking movement of the cam 42 will be necessary to actuate the control switches. A ready means is therefore provided for adjusting the amount of rock of the melting chamber.

When operating the control by means of push buttons, as will be described later, the switches 53 and 54 are ineffective and the cam 42 may be rotated past the points at which these switches would be actuated. As the cam 42 is rotated the members 57 and 58 are only deflected until the cam abutment surface 61a is engaged, whereupon the member 48 is shifted. With this arrangement damaging forces are prevented from being applied by the cam to the switches or actuating resilient fingers.

During the rocking movement of the melting chamber, the knob 46 will duplicate this rocking movement and by the provision of a pointer 65 on the knob and an index mark 66 on the face of the housing, it is possible for the operator at all times to note the movement of the furnace by watching the movement of the knob 46.

Also, the knob 46 provides means for manually adjusting the cam 42 in relation to the bearing members 61, so that the center of the angle of rock may in fact be made to correspond with the charging positions of the melting chamber.

It will of course be apparent that the charging position of the melting chamber is a variable and this charging position may be at any point within the limits of the safe rocking angle of the melting chamber. For example, if the charging opening is disposed at the uppermost point on the vertical center line through the chamber, then the operator could depress the knob 46 and rotate the cam member to rocking center position, at which position the pointer 65 on the knob will coincide with the index mark 66. The rocking movement of the chamber will then be in forward and reverse direction on either side of the charging position. If this is not done, there is danger of damaging the electrodes by a shifting of the furnace charge.

*Rocking range control mechanism*

As heretofore described, the rocking range or angle of rock of the melting chamber may be controlled by varying the position of arm 48 so that the leg 50 is moved more closely or further away from the cam 42. This movement of the arm 48 is controlled by a cam 67 which is provided with a cam surface 68. The cam surface 68 is increasingly spaced from the center of rotation of the cam. Associated with the cam surface is a cam roller 69ª which is rotatably mounted at the outer end of leg 52 of the arm 48. It will therefore be evident that movement of the cam will cause a clockwise rotation of the arm 48 and that the amount of this rotation will be dependent upon the pitch of the cam surface 68. By varying the pitch of the cam surface, it is possible to increase the rocking angle at any desired rate. In other words, a small rocking angle may be provided at the beginning of the melting operation and large increases of rocking angle may be provided as the end of the melting operation is approached. The pitch of the cam surface 68 should be such as to increase the rocking angle at such a rate as to give the best results.

While movement of the cam 68 will cause the rocking angle to be progressively increased, if desired, a constant rocking angle may be had at any desired value by setting the cam 67 at its position to give that rocking angle. So long as the cam remains stationary at this position, the melting chamber will continue to rock at the angle corresponding to this position.

In order to automatically prevent movement of the cam 67 past its maximum rock position, the leg 51 of arm 48 is provided at its outermost end with a plunger 69 which is mounted for axial movement in the end of the leg 51. One end of the plunger 69 is threaded to receive a nut 70 which is disposed on one side of the leg 51. The other end of the plunger is provided with a head portion 71 which is disposed on the opposite side of the leg 51. An expansion spring 72 is disposed between the head 71 and the associated surface of the leg, this spring operating to move the plunger head away from the leg until the nut 70 engages the opposite side thereof. The head 71 is arranged to engage an operating element 73 of a control switch 74 which is secured as by screws 75 in such position that the operating element 73 will be in the path of movement of the head 71. The switch 74 is in the control circuit of a timing motor for driving the cam 67, as will hereinafter be explained in detail. It may, however, be stated at this time that, when the cam 67 has moved to its position of maximum rock, the head 71 of plunger 69 engages the switch operating element 73 and causes the motor driving the cam to stop.

The cam 67 is integrally formed to have a hub which projects on one side of the cam to form a trunnion 76, this trunnion being fitted with a bearing sleeve 77 that is supported within a bearing 78. The bearing 78 is supported in the partition wall 79 which separates the cam compartment 41 from the gear compartment 80, this latter compartment being arranged to be filled with a suitable lubricant for the gears.

The other end of the cam hub extends through the forward wall of the housing as shown at 81 and is provided with a cup-shaped member 82 having a radially projecting actuating handle 83 as shown in Figure 6. Within the housing between the member 82 and the cam 67, the hub is provided with an annular flange 84ª having a lateral face upon which there is secured a lining member 85. The lining member is adapted to make surface engagement with a cooperatively associated surface 86 formed in the wall of the housing.

The bearing sleeve 77 at the other end of the hub is fixedly supported in a socket 87 and in the bearing 78. This socket contains an expansion spring 88 which is arranged at one end to engage a ring-shaped plate 89 and at its other end to engage an anti-friction bearing member 90 which is seated in the bottom end of the socket. The spring 88 operates to force the lining member 85 against the cooperatively associated surface 86, these latter members forming a thrust bearing and operating to provide sufficient friction to normally retain the cam 67 against movement, but permit ready adjustment thereof by means of the handle 83. It will therefore be evident that by placing the handle 83 on one of the rocking angle indicating indicia such as 84, in this instance the numeral 20 indicating a twenty-degree rock, the cam 67 will be in such position as to cause the melting chamber to rock at an angle of 20 degrees. In the same manner the handle 83 may be disposed on one of the other numerals to secure whatever rock is desired.

Selector and timing mechanism

Extending through the hub of the cam 67 is a shaft 91 which is free for rotative movement relative to the hub of the cam. One end of this shaft is extended through the bearing 78 and has mounted thereon a plurality of gears 92, 93, 94, 95, 96, and 97, these gears being respectively provided with 22, 36, 50, 64, 80, and 96 teeth. These gears are fixedly secured to the shaft 91 for rotation therewith.

Adjacent the rear face of gear 97, the back of the housing is formed to define a socket or well 98 in which there is mounted an expansion spring 99. One end of this spring surrounds the projecting end of shaft 91 and bears against the gear 97, whereas the other end of this spring is supported in the bottom of the socket by an anti-friction bearing 100.

The other end of shaft 91 extends through the cup-shaped member 82 and has secured thereto an adjusting knob 101 which is also cup-shaped and has its open end extending over the open end of cup-shaped member 82. The adjusting knob 101 has a central hub portion 102 which is mounted over a contracted end portion 103 of shaft 91 and held in abutting engagement with a shoulder 104 formed on the shaft by the contracted portion by means of a screw 105 in the shaft end.

The knob 101 is provided with diametrically opposed windows 106 and 107 through which an indicia bearing dial plate 108, which is mounted on the rim of cup-shaped member 82, is visible.

A lost motion connection is provided between the knob 101 and member 82. For this purpose, the member 82 is provided on its outer surface with a pair of angularly spaced abutment lugs 109 and 110. These lugs define limit stops between which a lug 111 on the interior of knob 101 may be moved. In order to permit removal of the knob from the shaft 91, when the screw 105 is removed, the dial plate 108 is provided with a peripheral notch 112 for the passage of lug 111.

Referring to Figure 6, it will be observed that the dial plate 108 is provided on its face with a triple dial having a plurality of angularly spaced numerals in concentric relationship which may be brought into view through the windows 106 and 107, when the knob 101 is rotated between the stops 109 and 110 relative to member 82.

Referring to Figure 2, it will be noted that the top of window 106 has disposed thereover the numerals 3—2—1, and that above window 107 the numerals 4—5—6 are disposed. These numerals are outwardly spaced from the center of rotation of the knob 101 so as to be movable over the respective numerals of the three concentric dials on the plate 108. The purpose of the numerals on the knob and numerals on the dial plate will be more fully explained subsequently.

The timing mechanism is driven from a small motor 113, as shown in Figure 5, which is connected to a reduced speed shaft 114 through a worm and gear generally indicated at 115. In practice, it has been found that a single phase motor of relatively low horse power and speed of 1500 R. P. M. works very satisfactorily. The worm and worm wheel connection 115 is arranged to reduce the motor shaft speed of 1500 R. P. M. to a speed of 2½ R. P. M. at the reduced speed shaft 114.

Rotatably mounted in the back wall of the main control housing is a shaft 116 which is supported adjacent one end in an anti-friction bearing 117 and at its other end by an enlarged end portion 118 which is in surface engagement with the interior of a bore 119 extending through the supporting portion of the housing. The anti-friction bearing 117 also serves as a thrust bearing for the shaft 116.

The shaft 114 is connected to shaft 116 by means of a spring coupling. For this purpose, the shaft 114 has secured thereto a collar 120, and shaft 116 has a collar 121 thereon. These collars are respectively provided with anchor posts 122 and 123 to which the respective ends of a coil spring 124 are secured, the coil spring being disposed around the adjacent ends of the collars.

This arrangement of coupling enables the motor 113 to be started under light load conditions before the load of the timing mechanism is imposed thereon.

The shaft 116 is provided with a worm 125 which meshes with a worm wheel 126, as shown in Figure 3. The worm 125 has a speed of 2½ R. P. M. and the ratio between this worm and wheel is 32 to 1.

The worm wheel 126 is secured at one end of a pinion shaft 127 by means of a nut 128. This shaft is rotatably mounted in an anti-friction bearing 129 supported on the rear wall of the housing. The pinion shaft 127 is provided with fifteen elongated teeth and is slidably supported at its forward end in a rotatably mounted sleeve 130. This sleeve is longitudinally movable within a bore portion of a housing 131 and an extension bearing sleeve 132. The bore 131 and interior of the bearing sleeve 132 are in registration.

The forward end of the sleeve 130 is provided with an extension member 133 of circular construction, one end of this member being contracted at 134 for insertion into the end of sleeve 130. The opposite end of member 133 is likewise contracted as shown at 135 and has rigidly secured thereto a digitally operable handle 136 having a skirt portion 137 extending over the member 133 and in telescopic relation with the bearing sleeve 132. By manipulating the handle 136 the sleeve 130 may be either rotated or longitudinally shifted to positions determined by a plurality of dwell points. These dwell points are determined by spaced circumferentially extending grooves 138 in the outer surface of the sleeve 130. Cooperatively associated with the grooves is a spring detent ball 139, this ball being disposed in an open-ended bore 140 of the housing, this bore communicating with bore 131 and being disposed at right angles thereto. An expansion spring 141 is disposed in the bore 140 and has one end engaging the ball 139 and its other end engaging an end plug 142 in the outer end of the bore.

The innermost end of the sleeve 130 has secured thereto a right angularly disposed bracket 143 which rotatably supports on opposite sides of the sleeve, gears 144 and 145.

As shown in Figure 3, the gear 145 is rearwardly offset relative to gear 144. Both of these gears mesh with the pinion 127 at all times, regardless of whether the gears are shifted axially along the pinion shaft by the manipulation of selector handle 136 or rotated relative thereto.

From the foregoing it will be appreciated that the gears 144 and 145 may alternately be brought into engagement with gears 92 to 97 inclusive simply by rotating the handle 136 in a clockwise or counterclockwise direction, providing the sleeve 130 has been longitudinally shifted to be removably retained in the proper dwell position, depending upon which gear it is desired to make a connection with. This arrangement provides a selective means for securing a variety of driving speeds for the cam 97.

In order that the operator may be assured that the handle 136 is being properly disposed to give a desired speed, the handle 136 has an arcuate latching member associated therewith, whereby the handle 136 may be latched in predetermined positions of rotation and longitudinal shifting of the sleeve 130.

The latch member 146 has a plurality of notches disposed at different levels so that when the handle is shifted in a counter-clockwise direction, a projecting portion 147 of the handle will first engage a notch 148, then by pulling the handle outwardly and rotating it further it may be disposed in notch 149 at a different level, and likewise in a notch 150 at still a different level. In a similar manner the handle 136 may be moved from the "off" position in a clockwise direction for disposition in notches 151, 152, and 153.

From the foregoing, it will be apparent that if the handle 136 in the "off" position is pulled outwardly to the position shown in Figure 3, and then rotated so that the projection 147 is disposed in notch 150, the gear 144 will make connection with gear 92 to give the highest driving speed. If the handle 136 is now moved in the opposite direction so as to bring the projection 147 into notch 153, the gear 144 is disengaged from gear 92 and gear 145 is brought into engagement with gear 93, which is the next slowest speed of drive. It is therefore possible for the operator to select a plurality of different driving speeds depending upon the position to which the selector handle 136 is moved. As shown in Figure 2, the various selective positions of the selector handle 136 are represented by indicia as shown at 154, wherein the various numerals indicate the relative speeds at the respective positions of the selector handle.

Manually operable switch control

Referring to Figure 2, it will be noted that there is incorporated with the main control unit at the right end thereof a single pole double throw switch 155 which may be actuated to "on" or "off" positions for rendering the automatic rocking control mechanism operative and non-operative as desired.

The main control unit is also arranged to removably have disposed thereon a portable push button control switch 156 having forward and reversing push buttons 157 and 158 respectively. This switch is connected at the end of a length of flexible cable 159 so that the furnace operator may carry the switch in his hand and move about the furnace when manually controlling the same, as during the charging and pouring operation.

Auxiliary rocking control mechanism

The auxiliary control consists of an arcuate cam member 160 which is mounted on an end of the melting chamber. Each end of this cam member is provided with an initially engageable cam surface 161 and a surface 162 which is disposed at a greater radius from the center of rotation of the chamber than the surface 161, and which will be engaged after the initial engagement of surface 161, when the melting chamber is further rotated. Cooperatively associated with the cam 160 is a limit switch control mechanism, generally indicated at 163.

As shown in Figure 9, the limit switch mechanism is mounted in a suitable housing 165 which has a removable cover member 166 secured thereto as by a bolt 167.

Extending rearwardly from the housing 165, there is provided a tubular bore portion 168 in which there is rotatably mounted a shaft 169 in anti-friction bearings 170 and 171. This shaft has secured to its outermost end an arm 172 in which there is mounted a roller 173. The limit switch mechanism is mounted on the furnace base structure by means of a bracket arm 174 which supports the device in such position that the roller 173 will be in the line of travel of the cam member 160 and may be engaged by the ends thereof.

The arm 172 is normally held in vertically disposed position by means of a tension spring 175 which opposes movement of the arm 172 from its normal vertical position, and operates to restore the arm to this position when it has been moved in either direction therefrom. The spring 175 is connected at one end to an arm 176 which is keyed to the shaft 169. The other end of this spring is connected to a leg 177 of an L-shaped rocker arm 178, this rocker arm being pivotally mounted for rotative movement on a pivot member 179. The other leg 180 of the rocker arm is provided at its outer end with a roller 181 which is adapted to engage a dwell recess 182 in a double cam 183, this cam being keyed to shaft 169. On each side of the dwell recess 182, are similarly disposed cam surfaces 184 and 185.

When the roller 181 is disposed in the dwell recess 182, the arm 172 is in normal vertically disposed position, but should the arm 172 be rotated in either direction from its normal position, the roller 181 will correspondingly move onto cam surface 184 or 185, and the arm 176 will be moved from its normal position to increase the tension of spring 175. It will therefore be evident that the spring 175 having been additionally tensioned will tend to restore the roller 181 to the dwell recess 182 and move the arm 172 to normal position.

In addition to the cam 183, the shaft 169 has fixedly secured thereto a pair of cams, namely, 186 and 187. These latter cams have corresponding cam surfaces 188 and 189 respectively, the centers of these cam surfaces being angularly spaced at substantially sixty degrees. In the normal position of the arm 172, the center line of cam surface 189 is disposed so as to pass through the center of a cylindrical cam follower 190 which is carried on a spring strip 191, this spring strip being anchored at its opposite end on a support 192 which is integrally formed with the housing of the limit switch. The cam surface 189, acts to deflect the spring strip 191 to close a switch 193 through an actuating button 194. This switch is normally open, but is maintained closed so long as the cam follower 190 is in contact with cam surface 189.

The cam surfaces 184 and 188 are so disposed relative to cam 187 that, if the arm 172 is rotated substantially twenty degrees on either side of normal position, one of these surfaces will come into contact with a cam follower. For example, if the arm 172 is moved substantially twenty degrees in a counter-clockwise direction, then the cam surface 188 will engage and deflect a spring strip 195 which is operative to actuate a normally closed switch 196. On the other hand, if arm 172 is moved substantially twenty degrees in a clockwise direction, the cam surface 184 will engage a cam follower and deflect spring strip 197 to actuate a normally open switch 198.

It will be observed that during the actuation of switches 196 and 198, the switch 193 continues to remain closed until the lever 172 has been rotated in either direction substantially a total of forty degrees from normal position. At this point, the follower 190 moves off the cam surface 189, thereby enabling switch 193 to open its contact. As soon as the cam 160 disengages the roller 173, the spring 175 acts in the manner previously described to restore the cam mechanism to its normal position, wherein switch 193 is again closed. The spring strips 195 and 197 are mounted in a similar manner to spring strip 191.

The initial movement of twenty degrees in either direction is obtained by one of the end cam surfaces 161 of cam 160 engaging the roller 173, whereas the additional twenty-degree movement is accomplished when the cam surface 162 of cam 160 engages the roller 173. The limit switch is so wired into the control circuit that actuation of switches 196 and 198 operate to reverse the rotation of the melting chamber, whereas the operation of switch 193 functions to cause the melting chamber rotation to cease. This will be more fully explained subsequently.

Operation

The main power circuit for the furnace driving motor, in this case three phase sixty cycles, as indicated at 199, is brought in through main manually operable disconnecting switches 200 and thence to a three pole main or safety contactor 201 having an operating coil 202. From this contactor, the power circuit is connected to a "forward" contactor 203 having an operating coil 204, and a "reversing" three pole contactor 205 having an operating coil 206. The reversing contactor has an additional interlocking contact 207. The outlet circuit from the forward and reversing contactors feed the rocking motor 18 and these contactors may be selectively actuated to run this motor either in a forward or reverse direction depending upon which contactor is closed.

The control circuit is fed from one phase of the power circuit through conductors 208 and 209 to a manually operable double pole single throw switch 210. This switch operates to connect the control circuit to a control transformer 211.

Assuming that it is desired to automatically control the rock of the melting chamber, the automatic rock switch 155 is moved into contact with contact 212, which is the "on" position of the switch. If the main control switch 210 is now closed, the safety contactor 201 is closed by its operating coil 202 becoming energized through the following circuit: From one side of the secondary of the control transformer 211 through fuse 213, conductor 214, conductor 215, through the closed contacts of switch 193, conductor 216, conductor 217 to one side of operating coil 202, from the other side of this coil to conductor 218 and thence through conductor 219 to the other side of the secondary of the control transformer.

Simultaneously with the closing of switch 210, the timing motor 113 is energized through the following circuit: From one side of control transformer 211 through fuse 213, conductor 214, conductor 220 through switch 155 to its contact 212, through conductor 221, conductor 222, through the contacts of switch 74, conductor 223 to one side of the timing motor, from the other side of the timing motor through conductor 224, thence through conductor 219 to the other side of the secondary of the control transformer 211. The timing motor therefore having been started will rotate members 101, and if the lug 111 thereon is in engagement with the lug 109 of member 82, then the cam 67 will immediately start moving to increase the rocking angle in accordance with the pitch of its cam surface.

Also when the switch 210 is closed, assuming that the melting furnace is in such position that neither the forward or reverse contactors 203 or 205 have been closed, then a control relay 225 determines the direction in which the furnace will initially rotate. This relay has an operating coil 226 and is arranged with normally closed contacts 227 which are closed when the operating coil is de-energized, and contacts 228 which will be closed when the operating coil 226 is energized. The operating coil 226 being de-energized, contacts 227 are closed, and the forward contactor 203 will close its contact by virtue of its operating coil 204 being energized through the following circuit: From one side of the secondary coil of control transformer 211, through fuse 213, conductor 214, conductor 220, through switch 155 to its contact 212, thence through conductor 221, through contact 227 of relay 225, conductor 229, conductor 230, through the normally closed contacts of push button control switch 158, thence through conductor 231, to one side of operating coil 204, thence through conductor 232, conductor 218, and thence through conductor 219 to the other side of the control transformer secondary. As soon as the forward contactor 203 closes, the driving motor 18 starts rotating the furnace chamber in the forward direction and at the same time will operate to rotate cam 42 in the same direction that the furnace is operating.

It will be seen that as the cam 67 continues to move the rocking angle is gradually increased due to the fact that arm 48 is being rotated in a clockwise direction about its pivot, thereby moving the switches 53 and 54 away from the cam so that it will necessitate greater rocking movement of the cam 42 in order to actuate these switches.

When the cam 42 has moved in a forward direction a distance depending upon the amount of movement which has transpired of cam 67, the cam 42 operates to close switch 53. Closing switch 53 will energize the control relay 225 through the following circuit: From one side of the secondary of the control transformer 211, through conductor 214, conductor 220, to the movable blade of switch 155, thence through conductor 233 to the contacts of switch 53, conductor 234, through the contacts of switch 54, conductor 235, operating coil 226 of relay 225, thence through conductor 236 to conductor 218, thence through conductor 219 to the other side of the control transformer secondary.

Since the operating coil of the forward contactor 203 is fed through the normally closed contacts 227 of relay 225, energization of this relay will cause the contacts 227 to open and de-energize the coil of the forward contactor, whereupon this contactor will open.

The control relay 225 then closes its normally open contacts 228 with the result that the reverse contactor 205 is closed by virtue of its operating coil 206 being energized through the following circuit: From one side of the secondary of the control transformer 211, through conductor 214, conductor 220, switch 155 to its contact 212, conductor 221, through contacts 228 of control relay 225, thence through conductor 237 to the normally closed contacts of push button control switch 157, through conductor 238 to one side of coil 206, thence through conductors 239 to conductor 218, thence through conductor 219 to the other side of the secondary of the control transformer 211.

As soon as the reversing contactor 205 closes its contacts, the motor 18 reverses its direction of movement to drive the melting chamber in the reverse direction.

Of course, with the melting chamber moving in the reverse direction, the cam 42 will also reverse its direction of movement and switch 53 will open its contact, but will not trip out the reversing contactor, for the reason that when this contactor closed, its interlocking contact 207 closed an interlocking feed circuit around switch 53. This circuit is as follows: From one side of control transformer 211, through fuse 213, conductor 240, through interlocking contact 207, conductor 241, through the contacts of switch 196, conductor 242, conductor 234, contacts of switch 54, conductor 235, through operating coil 226 of relay 225, conductor 236, conductor 218, conductor 219 and thence to the other side of the secondary of control transformer 211. The operating coil of relay 225 therefore remains energized and keeps contacts 228 thereof closed whereby the coil 206 remains energized.

As soon as the reverse movement of the melting chamber has been sufficient to cause cam 42 to open switch 54, the control coil 226 of relay 225 becomes de-energized with the result that its contacts 228 are opened and its contacts 227 are closed.

Action of the relay will open the energizing circuit of operating coil 206 of the reversing contactor, whereupon this contactor trips open. Moreover, the circuit is now established with the forward contactor which now closes and connects the driving motor so as to drive the melting chamber in a forward direction.

The rocking of the furnace chamber continues in alternate directions with gradually increasing angle of rock, due to the action of cam 67. When cam surface 160 engages the roller 173 in either movement of the melting chamber, the limit switch control then comes into operation.

Assuming that the melting chamber is being moved in forward direction, the forward contactor 203 being closed, the engagement of cam surface 161 with roller 173 will operate to close the contacts of switch 198. Closing of this switch will energize the operating coil of relay 225 through the following circuit: From one side of the secondary of the control transformer 211, through fuse 213, conductor 214, through the contacts of switch 198, conductor 234, the contacts of switch 54, conductor 235 to operating coil 226, from this coil through conductor 236 to conductor 218, and thence through conductor 219 to the other side of the secondary of the control transformer. The control relay 225 now being energized picks up, breaking its contacts 227 to trip out the forward contactor and close contacts 228 which energize the operating coil of the reverse contactor 205 as previously explained.

Immediately upon the closing of the reverse contactor, the interlocking contact operates as previously explained to interlock the energizing circuit of operating coil 226 of relay 225 through limit switch 196.

The rocking motor 18 therefore reverses its direction of rotation and drives the melting chamber in reverse direction until the cam surface 161 at the other end of cam 160 contacts with roller 173. Movement of the cam under these conditions operates to open limit switch 196 and de-energize the operating coil of relay 225, whereupon contacts 228 thereof are opened and contacts 227 closed to energize the forward contactor 203 as previously explained. It will therefore be evident that the melting chamber will continue to rock at its normal maximum rock wherein the reversals of the driving motor are controlled through the limit switches.

During the rocking of the melting chamber at full normal rock, the cam 67 continues to turn until it reaches the "off" position, at which point it has moved the arm 48 in a clockwise direction as far as possible. At this point the arm operates control switch 74 and opens its contacts to stop the timing motor 113, whereupon the cam 67 ceases to advance further.

If for any reason during the rocking of the melting chamber, when the switch 155 is set for automatic rocking control, the chamber should fail to reverse at the end of full normal rocking movement and should over-travel into the danger zone, then the cam surface 162 of cam 160 further moves the roller 173 to actuate the over-travel switch 193, which opens the supply circuit to the operating coil 202 of the safety contactor 201. This safety contactor will therefore open and de-energize the driving motor 18 and stop the movement of the melting chamber.

Since the over-travel switch has a tendency to open and is held closed by the action of spring 191 and spring 175, it will be apparent that if these springs should fail the safety switch would be opened to stop the operation of the furnace. In other words, normal operation cannot be accomplished unless the over-travel switch is in perfect condition. Moreover, due to the manner in which the safety switch is connected into the system, it is operated only occasionally, with the result that there is little likelihood of its getting out of order, and its reliability as a safety feature is materially increased.

At the conclusion of the normal rocking cycle, the control switch 155 should be thrown into engagement with its contact 243, which is the "off" position.

With the automatic control switch in "off" position, the control of the forward and reversing contactors is transferred to push button control switches 157 and 158, and since these switches are in the normally "off" position, the forward and reverse contactors will be opened to stop the motor 18 and discontinue the rocking movement of the melting chamber.

With the automatic control switch in "off" position, the safety contactor is closed by virtue of its operating coil 202 being energized through the following circuit: From one side of the secondary of the control transformer, to fuse 213, conductor 214, conductor 220, to switch 155, from its contact 243, through conductor 244, conductor 217 to one side of coil 202, thence through conductors 218 and 219 to the other side of the secondary of the control transformer.

Although the manually operable push button controls 157 and 158 are utilized during the charging and pouring operations, these controls may be used in emergency conditions for operating the furnace during the automatic rocking thereof. The push button controls may be used to operate the furnace in either forward or reverse direction without interfering in any way with the automatic control of the furnace, and as soon as the manual operation is suspended, the furnace will automatically return to automatic operation and continue with the rocking cycle.

For manually controlling the rocking of the furnace melting chamber, control push button 157 is depressed until its normally open contacts are closed, whereupon the forward contactor 203 is closed by energizing its operating coil through the following circuit: From one side of the control transformer, through fuse 213, conductor 214, conductor 220, conductor 245, the contacts of push button 157, conductor 246, conductor 230, the normally closed contacts of push button 158, conductor 231 to one side of coil 204, from the other side of this coil through conductor 232, conductor 218, and thence through conductor 219 to the other side of the control transformer. It will be apparent that the forward contactor will remain closed and operate the furnace rocking motor in forward direction only so long as the push button is kept depressed. As soon as the push button is released, the forward contactor opens to de-energize the driving motor 18.

Reverse movement of the melting chamber is secured by depressing the push button 158 until its normally open contacts are bridged, whereupon the reversing contactor closes by virtue of its operating coil being energized through the following circuit: From one side of the secondary of the control transformer, through fuse 213, conductor 214, conductor 220, conductor 247 through the contacts of push button 158, conductor 248, through the normally closed contacts of push button 157, thence through conductor 238 to one side of coil 206, through the other side of this coil through conductor 239 to conductor 218, and thence through this conductor to conductor 219 and the other side of the secondary of the control transformer. As in the case of the forward push button control, likewise the reverse push button control will operate the rocking motor 18 in reverse direction only so long as the push button 158 is depressed, and that when this push button is released, the reversing contactor drops open to stop the motor.

In connection with the use of the push button controls 157 and 158, it should be noted that since the pouring range is outside the safe rocking range of the melting chamber, in which case the over-travel switch is held open, the push button control will operate at this time only when the automatic rock control switch 155 is in the "off" position.

It will be evident from the foregoing description of the automatic and manual push button control that if a rocking center is chosen to correspond to a charging position either forwardly or to the rear of a vertical central position of the melting chamber, the cam control by means of cam 160 will come into operation when the melting chamber is rocked in one direction sooner than when it is rocked in the other direction. Under these conditions, the limit switch will continue to limit the rocking in the one direction, whereas the rock in the opposite direction will continue to be controlled by the action of cams 42 and 67 until the maximum rocking limit in the opposite direction is reached.

In Figure 12, clutches 249 and 250 have been diagrammatically shown so as to respectively permit adjustment of the rocking center index arm 46 and the rocking angle adjustment lever 83.

When it is desired to operate on a rocking cycle having an initial constant rocking period for a predetermined interval before the automatic increase of rock begins, this is accomplished by adjusting the lost motion connection between members 82 and 101. For this purpose the adjusting lever 83 would be set on the constant angle of rock desired, and member 101 is rotated in a counter-clockwise direction so that the lug 111 is moved in a counter-clockwise direction so as to be disposed at some point between the lugs 109 and 110, depending upon the time interval indicated on the dial 108. It will therefore be apparent that member 101 will have to be moved a predetermined distance before it strikes the lug 109 and starts movement of member 82 and cam 67 to begin the increase of the rocking angle. This will be more clearly understood in the examples of rocking cycles to be explained later.

*Illustrative rocking cycles*

The nameplate as shown in Figure 2 tabulates the approximate time in minutes required to reach full rock from various starting positions. The extreme left-hand column shows numerals from 1 to 6 which correspond to those on the selector notches, and indicate the relative speeds at which the timing motor will drive the cam 67. The three left-hand columns under the words "Front" or "Rear" show the approximate time interval when the charging door is started well down in the front or rear positions. The indicia heading these columns, namely, 20°, 40°, and 60°, indicate the setting of the range lever 83 on the range dial 84 at the start; that is, the angle of rock at the start. The three right-hand columns show similar indicia for positions of the charging door at the top center of the melting chamber.

For example, when the melting chamber is charged with the door at top center and the starting rocking angle is 40°, then with the selector set in number 3 notch, 18 minutes are required to bring the furnace up to full normal rock. This 18-minute interval is the period of increase of the rocking angle and does not include any delaying which may be added with the "constant rocking period" knob.

The afore-mentioned table is provided to give comparative values as a basis for arriving at the rocking cycle which is most suitable for any particular charge of metal.

In Figure 13, there is graphically represented the minimum and maximum length of rocking cycles which may be attained with the control described herein.

Curve M is secured when the rocking cycle is started with the door at top center of the safe rocking range, the selector handle 136 being set in notch No. 1 and the rocking range lever 83 being set for a rocking angle of 60°. The words "Automatic increase" should appear in the windows 106 and 107. Under these conditions the melting chamber will begin rocking at an angle of 60° and will increase to maximum rock in approximately six minutes.

As shown by curve N, if the door is at the top center, the selector on No. 1 notch, and the starting rock at 20°, the maximum rock angle will be reached in substantially 11 minutes.

On the other hand, if instead of having the charging door at the top center, the door is for example 10° above the limit of safe rock, that is well forward or well to the rear, then with the selector on No. 1 notch and the starting rock at 20°, the maximum rocking angle will be reached in approximately 15 minutes, as shown by the curve "O".

In the case of the three curves mentioned above, the selector was placed in No. 1 notch, which is the fastest speed of the cam 67.

Curve P shows the rocking cycle when the charging door is started at the top center of safe rocking range, the selector being placed on No. 6 notch, this being the slowest speed of drive for the cam 67, a 25-minute initial constant rock of 20° at the start. The constant rocking angle of 20° for 25 minutes is set by adjusting the rocking range lever 83 so that it will be at the 20-degree indication and then rotating the constant rocking period knob 101 until the numeral 25 appears in the window 107 under the numeral 6 above the window.

With this setting as shown by curve P it will be observed that the melting chamber will rock continuously at a 20-degree angle for 25 minutes and at this point will begin to increase the rocking angle and reach a maximum in approximately 76 minutes from the beginning of the rocking cycle or 51 minutes from the termination of the constant rocking period.

Curve Q represents a similar setting to that used for curve P, except that instead of starting the charging door at the top center of safe rocking range, the door in this case is started well to the front or rear, for example 10° above the limit of safe rock. In this case, the melting chamber will rock at a constant angle for approximately 25 minutes at the end of which time it will begin increasing the rocking angle and reach a maximum at substantially 68 minutes from the end of the constant rocking period or a total of 93 minutes from the beginning of the rocking cycle.

The curves M, N, O, P, and Q graphically represent the maximum and minimum length of rocking cycles, and it will be apparent that by varying the selector setting, the setting of the rocking range lever 83 and the setting of the constant rocking period knob 101, it is possible to secure substantially any desired rocking cycles between the limits as shown by the above curves.

From the foregoing description it will be apparent that the herein described invention provides a selective control mechanism which will enable adjustment of the constant and variable characteristics of the various elements of the rocking cycle to give a desired cycle of rocking operation; which will permit a pre-setting of the control mechanism so that once the rocking is started, the predetermined cycle will be automatically carried out; which embodies novel protective control features for guarding against abnormal conditions of operation which would cause the melting chamber to travel in a forward or reverse direction past the safe maximum angle of rock limit; which includes improved means for controlling the rate of increase of the rocking angle; which includes novel manual push button control for augmenting the automatic control mechanism and for jogging the furnace during the charging or pouring operations; which includes improved means for indicating the center of the rocking cycle; which provides improved control mechanism for automatically controlling the amount of increase of the rocking angle; control equipment including novel limit switch means for reversing operations on initial movement and for stopping further rocking of the melting chamber upon further or over-travel movement of the chamber; and which includes automatic means whereby the melting chamber may be initially rocked through a selectable constant rocking angle for a pre-determined period of time, after which the angle of rock will be progressively increased for a subsequent predetermined period of time at a varying rate of rock.

Now, of course, it is to be understood that while the invention is illustrated and described in detail in its preferred form, the invention is not to be thus limited, but only insofar as defined by the scope and spirit of the appended claims.

We claim as our invention:

1. In a device of the character described including a chamber mounted for rocking movement, power means for driving said chamber, means having parts responsive to the movement of said chamber for reversing its direction of movement, and timing means for varying the time interval between said reversals at a predetermined rate.

2. In a device of the character described including a chamber mounted for rocking movement, power means for driving said chamber, means having parts responsive to the movement of the chamber for reversing its direction of movement, adjustable means associated with said parts whereby the interval between reversals may be increased and decreased, and timing means for varying said adjustment according to a predetermined rate.

3. In a device of the character described including a chamber mounted for rocking movement, power means for driving said chamber, switch means responsive to the movement of said chamber for alternately reversing its direction of movement, and timing means for retarding the actuation of said switches at a predetermined rate.

4. In a device of the character described including a chamber arranged for rocking movement between predetermined maximum and minimum limits, means including a timing mechanism for alternately reversing the direction of movement of said chamber and progressively increasing the amount of rock from said minimum to said maximum at a predetermined rate.

5. In a furnace of the character described including a metal melting chamber arranged for rocking movement between predetermined maximum and minimum limits, means for alternately reversing the direction of movement of said chamber, and timing means for increasing the angle of rock defined by said points of reversal at a rate corresponding to the rate at which the metal is being melted.

6. In a device of the character described a chamber mounted for rocking movement, power means for driving said chamber, means for alternately reversing the direction of movement of the chamber and progressively increasing the angle of rock, at a predetermined rate, said means comprising a member movable in accordance with the movement of said chamber, control contacts alternately actuated in response to the movement of said member, and means for varying the time interval between the successive actuations of said contacts by the member.

7. In a device of the character described a chamber mounted for rocking movement, power means for driving said chamber, means for alternately reversing the direction of movement of the chamber and progressively increasing the angle of rock at a predetermined rate, said means comprising a cam member rotatable in accordance with the movement of said chamber, and control contacts alternately actuatable by said cam in response to its movement, said contacts being mounted for movement towards and away from said cam surface, whereby the time intervals between the actuations of said contacts may be varied.

8. In a device of the character described a chamber mounted for rocking movement, power means for driving said chamber, means for alternately reversing the direction of movement of the chamber and progressively increasing the angle of rock at a predetermined rate, said means comprising a cam member rotatable in accordance with the movement of said chamber, control contacts alternately actuatable by said cam in response to its movement, said contacts being mounted for movements towards and away from said cam surface, whereby the time intervals between the actuations of said contacts may be varied, and means for moving said contacts away from the cam surface with an increasing speed.

9. In a device of the character described a chamber mounted for rocking movement, power means for driving said chamber, means for alternately reversing the direction of movement of the chamber and progressively increasing the angle of rock at a predetermined rate, said means comprising a cam member rotatable in accordance with the movement of said chamber, control contacts alternately actuated by said cam in response to its movement, said contacts being mounted for movement towards and away from said cam surface, whereby the time intervals between the actuations of said contacts may be varied, means for moving said contacts as a unit, and means adjustable to vary the speed of movement of said contacts.

10. In a device of the character described having a chamber mounted for rocking movement; means for progressively increasing the angle of rock of said chamber from a minimum to a predetermined maximum value in increasing increments, said means comprising a member rotatable in accordance with the rocking movement of said chamber, contacts alternately actuated by said member when it is moved in opposite directions, means for moving said contacts to vary the time interval between the actuations of the contacts, and cam means for moving said contacts with increasing speed.

11. In a device of the character described having a chamber mounted for rocking movement; means for progressively increasing the angle of rock of said chamber from a minimum to a predetermined maximum value in increasing increments, said means comprising a member rotatable in accordance with the rocking movement of said chamber, contacts alternately actuated by said member when it is moved in opposite directions, means for moving said contacts to vary the time interval between the actuations of said contacts, cam means for moving said contacts with increasing speed, and means adjustable to drive said cam at different speeds, whereby the time interval of the rocking cycle for minimum to maximum rock may be varied.

12. In a device of the character described a chamber mounted for rocking movement, power means for driving said chamber, and control means operable to vary the angle of rock and the rate of change of said angle during a predetermined period of time, said means comprising a substantially heart shaped cam surface rotated in forward and reverse direction concurrently with the movement of said chamber, a pivot arm, a pair of spaced switches on said arm alternately actuated by said cam surface, and a second cam acting upon said arm, whereby the arm may be moved in a predetermined manner, to vary the position of said switches relative to said first cam surface.

13. In a device of the character described, a chamber arranged for progressively increasing rocking movement from a predetermined minimum to a maximum angle of rock, means normally controlling the rocking movement, and auxiliary control means for superseding the first means when the rocking movement of the chamber reaches the maximum angle of rock.

14. In a device of the character described, a chamber arranged for progressively increasing rocking movement from a predetermined minimum to a miximum angle of rock, means normally controlling the rocking movement, and auxiliary control means for superseding the first means when the rocking movement of the chamber reaches the maximum angle of rock, said auxiliary control means including cam members operated in response to the movement of the chamber.

15. In a device of the character described, a chamber arranged for rocking movement to predetermined angularly spaced maximum limits, control means arranged to normally rock the chamber in progressively increasing amounts, the mid-point of the normal rocking angles being angularly disposed from the mid-point of the angle defined by said maximum limits, and auxiliary control for superseding the first control means when the movement of the chamber in one direction reaches the maximum limit, the normal control being effective in the other direction until the other maximum limit is reached.

16. In a device of the character described a chamber arranged for progressively increasing rocking movement from predetermined minimum to a maximum limit of safe rock, means normally controlling the rocking movement, auxiliary control means for superseding the first means when the rocking movement of the chamber reaches the maximum angle of rock, and means for stopping the movement of the chamber when the maximum angle of rock is exceeded.

17. In a device of the character described, a chamber arranged for progressively increasing rocking movement from a predetermined minimum to a maximum angle of rock, means normally controlling the rocking movement, auxiliary control means for superseding the first means when the rocking movement of the chamber reaches the maximum angle of rock, and manually operable means controlling the movement of said chamber in lieu of the normal and auxiliary controls.

18. In a device of the character described, a chamber arranged for rocking movement, cam means carried by said chamber defining the maximum safe rocking angle, a movably mounted member disposed for engagement by said means and initially moved thereby when the maximum limit of safe rocking in either direction is reached, and further moved when the maximum limit is exceeded, switch means actuated in response to said initial movement for reversing the direction of movement of said chamber, and other switch means operable in response to said further movement for stopping the movement of said chamber.

19. In a device of the character described, a chamber arranged for rocking movement, cam means carried by said chamber defining the maximum rocking angle, a movably mounted member disposed for engagement by said means and initially moved thereby when the maximum limit of safe rocking in either direction is reached, and further moved when the maximum limit is exceeded, switch means actuated in response to said initial movement for reversing the direction of movement of said chamber, other switch means operable in response to said further movement for stopping the movement of said chamber, and manually operable jogging control for moving the chamber after the latter switch means has operated.

20. In a device of the character described having a chamber mounted for rocking movement, means for normally controlling the rocking movement of the chamber, and means operative to reverse the direction of movement of the chamber when it is rocked to predetermined limits, and stop the rocking movement when the chamber is moved in either direction past said limits, said means comprising a rotatable member, means biasing movement of said member in either direction from a normally disposed position, cam means carried by said member, a pair of switches respectively actuated by said cam means upon an initial movement of said member in either direction from its normal position, and a switch actuated by said member when it is further moved from its normal position in either direction.

21. Control means comprising a rotatably mounted member having a normal position, means biasing movement of said member in either direction from its normal position, a cam carried by said member, a switch actuated by said cam when the member is slightly moved in one direction from its normal position, a second cam carried by said member, a second switch actuated by the latter cam when the member is slightly moved in the opposite direction, a third cam carried by said member, and a third switch actuated by said third cam when the member is additionally moved in either direction.

22. Apparatus of the character described comprising a chamber arranged for oscillatory movement, and means for oscillating said chamber in successively increasing angles of rocking movement for a predetermined interval of time, said means including a rock controlling member arranged when moved in one direction to cause an increase in the rocking angle of the chamber, a cam surface for moving said member, the amount of increase of said rock being determined by the slope of said cam surface, and means for driving said cam surface at a predetermined speed.

23. Apparatus of the character described comprising a chamber arranged for oscillatory movement, means for oscillating said chamber in successively increasing angles of rocking movement for a predetermined interval of time, said means including a rock controlling member arranged when moved in one direction to cause an increase in the rocking angle of the chamber, a cam surface for moving said member, the amount of increase of said rock being determined by the slope of said cam surface, and a variable speed drive for the cam surface.

24. Apparatus of the character described comprising a chamber arranged for oscillatory movement, means for oscillating said chamber in successively increasing angles of rocking movement for a predetermined interval of time, said means including a rock controlling member arranged when moved in one direction to cause an increase in the rocking angle of the chamber, a cam surface for moving said member, the amount of increase of said rock being determined by the slope of said cam surface, means for driving said cam surface at a predetermined speed, and time delay means providing an adjustable time delay before starting the rocking angle increase.

25. Apparatus of the character described comprising a chamber arranged for oscillatory movement, means for oscillating said chamber in successively increasing angles of rocking movement for a predetermined interval of time, said means including a rock controlling member arranged when moved in one direction to cause an increase in the rocking angle of the chamber, a cam surface for moving said member, the amount of increase of said rock being determined by the slope of said cam surface, means for driving said cam surface at a predetermined speed, and means responsive to a predetermined movement of the rock controlling member for rendering the driving means inoperative.

26. In means for controlling the movement of an oscillatably mounted chamber, a cam oscillatably movable with said chamber, a cam follower having a cam abutment surface, a switch carried by said cam follower, and a movable switch actuating member projecting past said abutment surface for normal engagement by said cam, said abutment surface acting to limit the movement of said switch actuating member during abnormal movements of said cam.

27. In means for controlling the movement of an oscillatably mounted chamber, a driving motor, a supply circuit for said motor, reversing switches energizable to control the direction of rotation of said motor, a switch in the supply circuit of said motor arranged to open when deenergized, and a limit switch responsive to abnormal movements of said chamber for deenergizing the switch in the supply circuit, whereby the motor is rendered inoperative.

28. In means for controlling the movement of an oscillatably mounted chamber, a driving motor, a supply circuit for said motor, reversing switches energizable to control the direction of rotation of said motor, a safety switch in the supply circuit of said motor arranged to open when deenergized, a limit switch responsive to abnormal movements of said chamber for deenergizing the safety switch to render the motor inoperative, said limit switch normally tending to open and including cam actuated spring means for normally maintaining the limit switch closed.

LEON V. PITTMAN.
CLAUDE M. WEINHEIMER.